US007929513B2

(12) United States Patent
Stark (10) Patent No.: US 7,929,513 B2
(45) Date of Patent: Apr. 19, 2011

(54) WIRELESS LOCAL AREA NETWORK ACCESS POINTS, END-POINT COMMUNICATION DEVICES, AND COMPUTER PROGRAM PRODUCTS THAT GENERATE SECURITY ALERTS BASED ON CHARACTERISTICS OF INTERFERING SIGNALS AND/OR CONNECTION MESSAGES (75) Inventor: Barbara Stark, Roswell, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 1035 days.

(21) Appl. No.: 11/589,439

(22) Filed: Oct. 30, 2006

(65) Prior Publication Data
US 2008/0101324 A1 May 1, 2008

(51) Int. Cl.
H04W 4/00 (2009.01)
(52) U.S. Cl. ........ 370/345; 370/332; 370/338; 370/232; 370/395.2; 455/410; 709/223; 709/224
(58) Field of Classification Search .................. 370/338, 370/469, 230, 345, 332, 232, 395.2; 726/2, 726/3, 4, 16, 17, 21, 23; 709/223, 224; 455/410
See application file for complete search history.

(56) References Cited

U.S. PATENT DOCUMENTS

| 6,370,373 | B1 * | 4/2002 | Gerth et al. | 455/410 |
|---|---|---|---|---|
| 6,954,616 | B2 * | 10/2005 | Liang et al. | 455/63.1 |
| 7,633,869 | B1 * | 12/2009 | Morris et al. | 370/232 |
| 2002/0115444 | A1 * | 8/2002 | Yu et al. | 455/456 |
| 2003/0120809 | A1 * | 6/2003 | Bellur et al. | 709/239 |
| 2004/0047324 | A1 * | 3/2004 | Diener | 370/338 |
| 2004/0218562 | A1 * | 11/2004 | Orava et al. | 370/329 |
| 2004/0255167 | A1 * | 12/2004 | Knight | 713/201 |
| 2004/0255297 | A1 * | 12/2004 | Horstemeyer | 718/100 |
| 2005/0025182 | A1 * | 2/2005 | Nazari | 370/469 |
| 2005/0033641 | A1 * | 2/2005 | Jha et al. | 705/14 |
| 2005/0047384 | A1 * | 3/2005 | Wax et al. | 370/338 |
| 2005/0174960 | A1 * | 8/2005 | Perlman | 370/328 |
| 2005/0216747 | A1 * | 9/2005 | Yeap et al. | 713/185 |
| 2005/0261970 | A1 * | 11/2005 | Vucina et al. | 705/16 |
| 2006/0018480 | A1 * | 1/2006 | Kachi | 380/270 |
| 2006/0029015 | A1 * | 2/2006 | Hinsey | 370/328 |
| 2006/0133414 | A1 * | 6/2006 | Luoma et al. | 370/466 |
| 2006/0168292 | A1 * | 7/2006 | Yukimatsu | 709/231 |
| 2006/0219776 | A1 * | 10/2006 | Finn | 235/380 |
| 2007/0054670 | A1 * | 3/2007 | Kalika et al. | 455/446 |
| 2007/0094741 | A1 * | 4/2007 | Lynn et al. | 726/26 |
| 2007/0140145 | A1 * | 6/2007 | Kumar et al. | 370/254 |
| 2007/0268911 | A1 * | 11/2007 | Alve | 370/395.52 |
| 2007/0274274 | A1 * | 11/2007 | Carothers | 370/338 |
| 2007/0294399 | A1 * | 12/2007 | Grossner et al. | 709/224 |
| 2008/0225799 | A1 * | 9/2008 | Lee et al. | 370/332 |

* cited by examiner

Primary Examiner — Pierre-Louis Desir
(74) Attorney, Agent, or Firm — Myers Bigel Sibley & Sajovec, P.A.

(57) ABSTRACT

A wireless local area network access point (WAP) includes a transceiver, a controller, and a security unit. The transceiver communicates messages with an end-point communication device through a wireless air interface in a defined frequency band. The controller receives through the transceiver a connection request message containing a password from the end-point communication device, authenticates the received password, and responds to the authentication by transmitting through the transceiver to the end-point communication device an encryption key as a connection response message. The security unit generates a security alert based on measured characteristics of one or more received connection request messages and/or based on measured characteristics of interfering signals in the defined frequency band.

10 Claims, 6 Drawing Sheets

WIRELESS LOCAL AREA NETWORK ACCESS POINTS, END-POINT COMMUNICATION DEVICES, AND COMPUTER PROGRAM PRODUCTS THAT GENERATE SECURITY ALERTS BASED ON CHARACTERISTICS OF INTERFERING SIGNALS AND/OR CONNECTION MESSAGES

FIELD OF THE INVENTION

The present invention relates to the field of communications in general and more particularly, to configuration of a wireless local area network between an access point and one or more end-point communication devices.

BACKGROUND OF THE INVENTION

Wireless Local Area Networks (WLANs) have emerged as one of the preferred technologies for networking electronic communication devices to one another and to other networks, such as the Internet. Because of the wide availability of WLAN networks worldwide, and with most providing free or low-cost publicly accessible Internet access, WLAN connectivity has become a highly desired feature in new mobile communication devices. WLAN devices typically operate according to the IEEE 802.11 specifications and communicate with one another using spread-spectrum radio communications in a defined frequency band such as, for example, 2.4 GHz.

A WLAN may include a WLAN access point (WAP) and a plurality of user end-point communication devices, such as laptop/desktop/palmtop/tablet computers and/or Personal Data Assistants (PDAs). The WAP serves as a network master for managing communications with end-point devices within its service area, and may communicatively interface the end-point devices to one another and/or to another network, such as the Internet.

WLAN devices continue to suffer from a relatively complex user setup process to initially configure a WAP and one or more end-point devices to communicate with one another through a secure interface. Historically, to establish a secure interface, a user has manually entered a key into an end-point device that matches a key in the WAP. Recently, working groups called the Wireless Ethernet Compatibility Alliance and the Wi-Fi Alliance have developed wireless networking standards called Wi-Fi (wireless fidelity) based on the IEEE 802.11 specifications. Part of the Wi-Fi standards are directed to simplifying the user setup process for configuring communications between a WAP and an end-point device.

Through a process called push button configuration, a user initiates a configuration process by pressing/selecting a physical/logical button on the WAP and on the end-point device to initiate an automated configuration process therebetween. The end-point device transmits a probe request message that includes an industry defined default PIN to the WAP. The WAP authenticates the received PIN and communicates a probe response message that contains an encryption key to the end-point device. The end-point device responds to the probe response message by transmitting an encryption key to the WAP. The exchanged encryption keys are used to configure communications between the WAP and the end-point device.

Through another process called PIN configuration, a user initiates a configuration process at the end-point device by entering a PIN that is read from markings on the WAP, such as from a printed label on the WAP. The end-point device communicates the PIN in a probe request message to the WAP. The WAP authenticates the received PIN and transmits a probe response message that contains an encryption key to the end-point device. The end-point device communicates an encryption key to the WAP. The WAP and the end-point device use the exchanged encryption keys to configure communications therebetween.

Accordingly, the push button configuration process and the PIN configuration process can simplify the exchange of PINs between a WAP and an end-point device and, thereby, may simplify the configuration process for a user. However, the use of standard/printed PINs may reduce the security of a WAP and end-point devices that connect thereto, and may make the WAP and end-point devices more prone to security attack. The complexity of manual configuration processes has sometimes motivated users to select simple keys, which can also make the associated devices more prone to security attacks.

SUMMARY OF THE INVENTION

In some embodiments of the present invention, a wireless local area network access point (WAP) includes a transceiver, a controller, and a security unit. The transceiver is configured to communicate messages with an end-point communication device through a wireless air interface in a defined frequency band. The controller is configured to receive through the transceiver a connection request message containing a password from the end-point communication device, to authenticate the received password, and to respond to the authentication by transmitting through the transceiver to the end-point communication device an encryption key as a connection response message. The security unit is configured to generate a security alert based on measured characteristics of one or more received connection request messages and/or based on measured characteristics of interfering signals in the defined frequency band.

In some further embodiments, the security unit may generate the security alert as a visual and/or audible notification to a user that indicates that the user should presently inhibit the WAP from transmitting the connection response message with the encryption key and associated configuration of a new connection to an end-point communication device. The WAP may include an IEEE 802.11 access point, and the controller may be configured to receive an IEEE 802.11 formatted probe request message as the connection request message, and may transmit an IEEE 802.11 formatted probe response message as the connection response message.

In some further embodiments, the security unit may be further configured to measure a time between: 1) receipt of the connection request message and/or transmission of the connection response message; and 2) a subsequent onset of at least one interfering signal having at least a threshold magnitude in the defined frequency band, and to generate the security alert based on the measured time being less than a threshold time.

In some further embodiments, the controller may be further configured to transmit a beacon message that contains information that is indicative of a present connection configuration availability of the WAP. The security unit may be further configured to measure a time between transmission of the beacon message and subsequent onset of at least one interfering signal having at least a threshold magnitude in the defined frequency band, and to generate the security alert based on the measured time being less than a threshold time.

In some further embodiments, the controller may be further configured to transmit a beacon message that contains information that is indicative of a present connection configuration availability of the WAP. The security unit may be further configured to generate the security alert based on receipt of at least a threshold number of connection request messages within a threshold time following transmission of the beacon message, where the threshold number of connection request messages is greater than one.

In some further embodiments, the WAP further includes a user interface. The controller may be further configured to transmit the beacon message in response to a pushbutton mode activated by a user selection on the user interface of the WAP. The security unit may be further configured to measure a time correlation between transmission of the beacon message responsive to a user selection on the user interface of the WAP and a subsequent receipt of the connection request message which is expected to have been generated by a subsequent delayed user selection on a user interface of the end-point communication device. The security unit may generate the security alert in response to the time correlation measurement indicating that less than a threshold time occurred between the transmission of the beacon message and the subsequent receipt of the connection request message.

In some further embodiments, the security unit may be further configured to generate the security alert by recording information relating to the security alert as a user accessible log in a nonvolatile memory in the WAP. The WAP may include an interface that is configured to be communicatively connected to the Internet through a broadband modem. The security unit may be further configured to communicate information relating to the security alert through the interface and connected Internet to a network management center. The security unit may be further configured to communicate information relating to the security alert as an email message and/or as an instant message through the interface and connected Internet to a defined user destination address.

In some other embodiments of the present invention, an end-point communication device includes a transceiver, a controller, and a security unit. The transceiver is configured to communicate messages with a wireless local area network access point (WAP) through a wireless air interface in a defined frequency band. The controller is configured to transmit through the transceiver to the WAP a connection request message containing a password, to receive a connection response message through the transceiver from the WAP that contains an encryption key, and to configure a communication network with the WAP in response to the connection response message. The security unit is configured to generate a security alert based on measured characteristics of one or more received connection response messages and/or based on measured characteristics of interfering signals in the defined frequency band.

In some further embodiments, the security unit may be further configured to generate the security alert by generating a visual and/or audible notification to a user that indicates that the user should presently inhibit the end-point communication point from configuring a communication network with the WAP.

In some further embodiments, the security unit may be further configured to measure a time between: 1) transmission of the connection request message and/or receipt of the connection response message; and 2) a subsequent onset of at least one interfering signal having at least a threshold magnitude in the defined frequency band, and to generate the security alert based on the measured time being less than a threshold time.

In some further embodiments, the controller may be further configured to receive a beacon message from the WAP that contains information that is indicative of a present connection configuration availability of the WAP. The security unit may be further configured to measure a time between receipt of the beacon message and subsequent onset of at least one interfering signal having at least a threshold magnitude in the defined frequency band, and to generate the security alert based on the measured time being less than a threshold time.

In some further embodiments, the controller may be configured to receive a beacon message from the WAP that contains information that is indicative of a present connection configuration availability of the WAP. The security unit may be further configured to generate the security alert based on a measurement of a rate and/or periodicity of receipt of a plurality of the beacon messages.

In some further embodiments, the controller may be further configured to transmit the connection request message in response to a pushbutton mode activated by a user selection on a user interface of the end-point communication device. The security unit may be further configured to measure a time between transmission of the connection request message and a subsequent receipt of the connection response message which is expected to have been generated by a subsequent delayed user initiation of a pushbutton mode by a user selection on a user interface of the WAP which initiates transmission of the connection response message therefrom. The security unit may generate the security alert based on the measured time being less than a threshold time.

In some further embodiments, the security unit may be further configured to generate the security alert by recording information relating to the security alert as a user accessible log in a nonvolatile memory of the end-point communication device. The end-point communication device may further include an interface that is configured to be communicatively connected to the Internet through a modem. The security unit may be further configured to communicate information relating to the security alert through the interface and connected Internet to a network management center, and/or to communicate information relating to the security alert as an email message and/or as an instant message through the interface and connected Internet to a defined user destination address.

In some other embodiments, a computer program product for operating a wireless local area network access point (WAP) includes a computer readable storage medium having computer readable program code embodied therein. The computer readable program code includes computer readable program code that is configured to receive a connection request message containing a password from an end-point communication device, computer readable program code that is configured to authenticate the received password, computer readable program code that is configured to respond to the authentication by transmitting to the end-point communication device an encryption key as a connection response message, and computer readable program code that is configured to generate a security alert based on measured characteristics of one or more received connection request messages and/or based on measured characteristics of interfering signals in the defined frequency band.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another elements, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Embodiments of the present invention are directed to devices that can configure a wireless local area network to communicate with one another across a wireless air interface using RF signaling in a defined frequency band. At least one of the WLAN devices measures characteristics of interference signals in the defined frequency band (interfering signals) and/or measures characteristics of one or more messages that are requesting connection, and generates a security alert based on the measured characteristics. The security alert may be used to create a traceable log of one or more events associated with the security alert, and/or to inform a user and/or a network management center of the security alert. Accordingly, the WLAN device may alert a user/operator of a potential ongoing security attack and may warn the user/operator to not attempt further configuration of the network at the present time or to use an alternate process (e.g., a more secure process) to configure devices in the WLAN.

Figure 1:
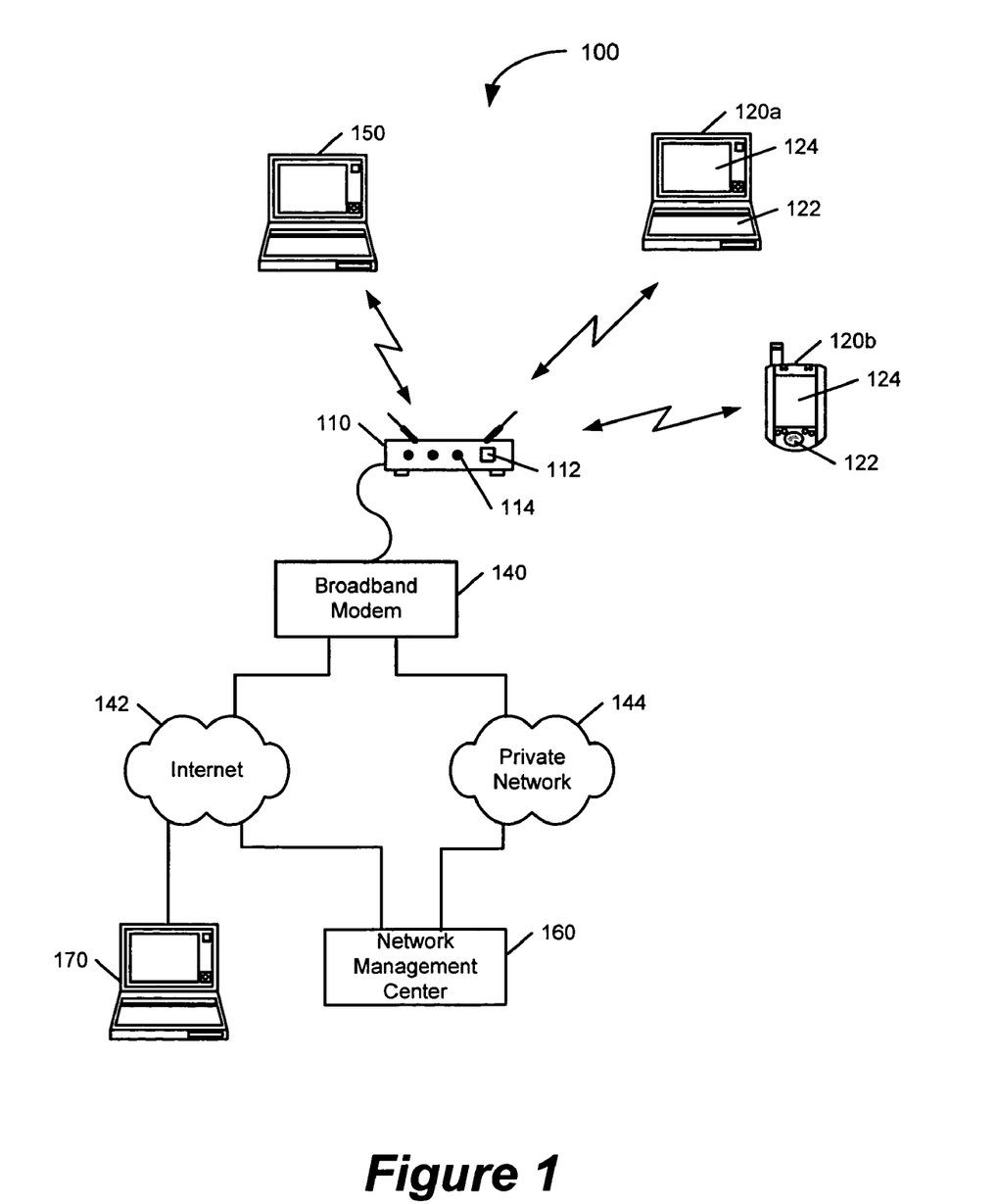
FIG. 1 is a block diagram of a communications system that includes a WAP and a plurality of end-point devices that can configure a communications WLAN therebetween, according to some embodiments of the present invention, and illustrates an intruder device that is attempting to improperly connect to the WAP.

FIG. 1 is a block diagram of a communications system 100 and related methods that includes a WAP 110 and a plurality of end-point communication devices 120a-b that can configure a communications network therebetween according to some embodiments of the present invention. The WAP 110 may be connected to a broadband modem 140 that can include, but is not limited to, a coaxial cable modem and/or a digital subscriber line (DSL) modem. The broadband modem 140 may be configured to be connected to the Internet 142 and/or a private network 144. The WAP 110 may thereby communicatively connect the plurality of end-point devices 120a-b to the Internet 142 and/or the private network 144 through the broadband modem 140.

In some embodiments, the WAP 110 and the end-point devices 120a-b may be configured to form a IEEE 802.11 based communication network. The WAP 110 and the end-point devices 120a-b may support a push button configuration process and/or a PIN configuration process for configuring a new communications connection therebetween. As shown in FIG. 1, the WAP 110 can include a button 112, or other user input interface, that may be pressed by a user to initiate the push button configuration process at the WAP 110. The end-point devices 120a-b can include a user interface, such as a keyboard 122 and a display 124, that may be actuated by a user to select via software a displayed button and initiate the push button configuration process at a selected one of the end-point devices 120a-b.

To initiate a push button configuration process, a user can press button 112 to cause the WAP 110 to transmit a beacon message that indicates that the WAP 110 is presently in a pushbutton mode awaiting receipt of a probe request message. The user can press/select a hardware/software button/displayed indicia on the selected end-point device 120a-b to transmit therefrom a probe request message that includes the standard password to the WAP 110 (e.g., the standard password being known to the WAP 110). Upon receipt of the probe request message, the WAP 110 authenticates the received password and then communicates a probe response message that may contain a password and/or an encryption key to the selected end-point device 120a-b. The selected end-point device 120a-b responds to the probe response message by transmitting an encryption key to the WAP 110. The exchanged encryption keys are used to configure communications between the WAP 110 and the selected end-point device 120a-b.

A potential security weakness that may arise during a push-button configuration process of the communications system 100, is that the WAP 110 waits for a probe request message containing a password that is known not just by itself and a user selected end-point device, but may also be known to other devices. Consequently, an intruder communication device 150, which is also in the service area of the WAP 110 (such as located in a neighbor's house, located in the same/ adjacent Wi-Fi provider business), may be configured to watch for and maliciously respond to beacon messages. Thus, for example, the intruder device 150 may be configured to respond to the beacon message transmitted by the WAP 110 by transmitting a probe request message containing the standard password to the WAP 110. The intruder device 150 may thereafter exchange encryption codes with the WAP 110 and improperly gain access to the Internet 142 and/or the private network 144.

Thus, by way of further example, a user may press button 112 on the WAP 110 causing the WAP 110 to transmit the beacon message. However, before the user is able to select a software pushbutton on end-point device 120a which the user desires to connect to WAP 110, the intruder device 150 more quickly responds to the beacon message by transmitting the probe request message with the standard password to improperly gain access to the WAP 110. Consequently, although the push button configuration process is supposed to allow secure configuration of a WAP and end-point device, the intruder device 150 can be configured to exploit the security weakness of using a password that is known to more devices than just the WAP and the end-point device intended by the user.

Figure 2:
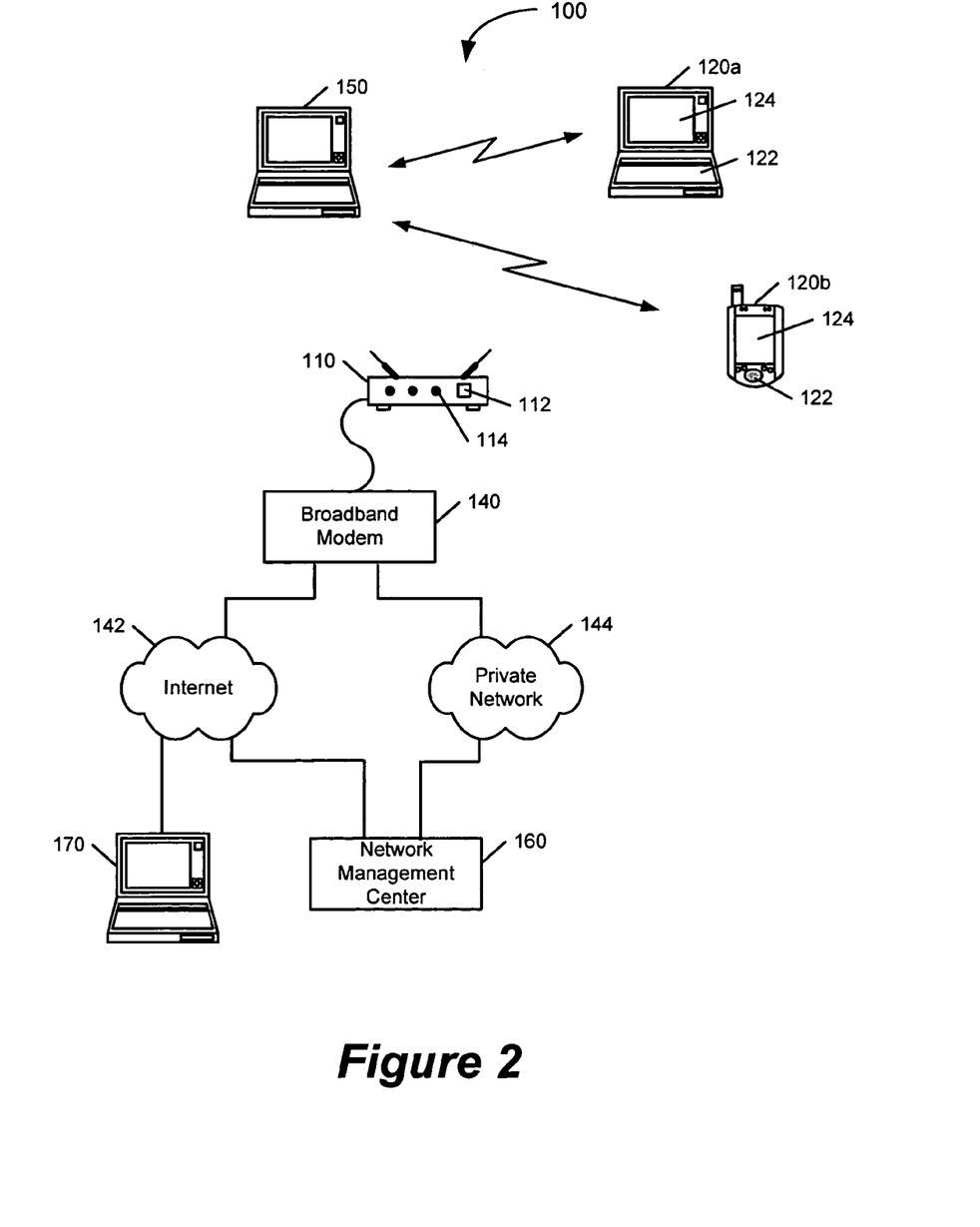
FIG. 2 is a block diagram of the communications system of FIG. 1 and with an intruder device is attempting to improperly connect to one of the end-point devices.

The intruder device 150 may be configured to attempt to improperly gain access to the end-point devices 120a-b, such as shown in the block diagram of FIG. 2. Referring to FIG. 2, the intruder device 150 is attempting to improperly gain access to the end-point devices 120a-b. The intruder device 150 may respond to a probe request message from the end-point device 120a by transmitting to the end-point device 120a one or more messages, such as a probe response message that may include an encryption key for use with the intruder device 150, to make the intruder device 150 appear to be the WAP 110 or another WAP. In this manner, the intruder device 150 may improperly establish a communication connection with the end-point device 120a. Upon establishing the communication connection to the end-point device 120a, the intruder device 150 may be used to improperly gain access to, for example, file folders on the end-point device 120a that are configured for network sharing. The intruder device 150 may similarly attempt to obtain a communication connection to the end-point device 120b and/or other end-point devices.

Referring again to FIG. 1, the WAP 110 and the end-point devices 120a-b may alternatively or additionally be configured to support the PIN configuration process which includes tasking a user with entering at a selected one of the end-point devices 120a-b a PIN that is read from markings on the WAP 110, such as from a printed label on the WAP 110. The selected end-point device 120a-b communicates the PIN in a probe request message to the WAP 110. The WAP 110 authenticates the received PIN and transmits a probe response message that contains a password and/or an encryption key to the selected end-point device 120a-b. The selected end-point device 120a-b communicates an encryption key to the WAP 110. The WAP 110 and the selected end-point device 120a-b use the exchanged encryption keys to configure communications therebetween.

A potential security weakness that may arise during the PIN configuration process of the communication system 100, is that the WAP 110 waits for a probe request message containing a password that may be read by an unintended user from a housing of the WAP 110 and/or which may be determined by a process of trial and error guessing through a list of passwords that are known to be used by a particular manufacturer. Accordingly, the intruder device 150 may be configured to repetitively transmit probe request messages containing different passwords, among a list of passwords that are known to be used by particular manufacturer(s), until through a trial and error process the correct password is transmitted and the WAP 110 responds with the probe response message. The intruder device 150 may thereby exchange encryption keys with the WAP 110 and improperly gain access to the Internet 142 and/or the private network 144. Alternatively, or additionally, the intruder device 150 may make repetitive login attempts using a trial and error process with different ones in a list of passwords.

The intruder device 150 may be configured to interfere with configuration of the network among the WAP 110 and/or the end-point devices 120a-b. The intruder device 150 may respond to its receipt of the beacon message from the WAP 110, a probe request message from one or more of the end-point devices 120a-b, and/or the probe response message from the WAP 110 by transmitting a signal in the defined frequency band utilized for communication by the WAP 110 and the end-point devices 120a-b so as to interfere with their configuration process(es). The intruder device 150 may carry out such interference for a malicious purpose of denying access to the WAP 110 for end-point devices and/or as an unintended consequence of its repetitive attempts to improperly gain access to the WAP 110 and/or to the end-point devices 120a-b.

According to some embodiments of the present invention, the WAP 110 is configured to measure characteristics of one or more probe request messages that appear to come from a valid end-point device and/or to measure characteristics of interfering signals in the defined frequency band used to communicate with end-point devices 120a-b. The WAP 110 is also configured to generate a security alert based on one or more of those measured characteristics.

The WAP 110 may generate a security alert when it determines that there is a time correlation between receipt of the probe request message, its transmission of the beacon message, and/or its transmission of the probe response message and the subsequent onset of an interfering signal in the defined frequency band. For example, the WAP 110 may measure a time between receipt of the probe request message and the subsequent onset of a least one interfering signal having a least a threshold magnitude in the defined frequency band, and may generate the security alert based on the measured time being less than a threshold time. Similarly, the WAP 110 may measure a time between transmission of the beacon message and/or the probe response message and a subsequent onset of a least one interfering signal having a least a threshold magnitude in the defined frequency band, and may generate the security alert based on the measured time being less than a threshold time. When, for example, the WAP 110 determines that the interfering signal occurs soon after receipt of the probe request message, soon after transmission of the beacon message, and/or soon after transmission of the probe response message and/or when it observes a recurring pattern of such interference signals occurring after message receipt/transmission, the WAP 110 may determine that another device is attempting to interfere with and/or gain access to the WAP 110 and/or end-point devices. The WAP 110 may respond to that determination by generating the security alert.

Another exemplary attack on the security of the LAN that may be carried out by the intruder device 150 is an attempt to use one or more disassociation messages to obtain encryption information of one or more end-point devices 120a-b networked with the WAP 110. For example, the intruder device 150 may transmit one or more disassociation messages to the end-point devices 120a-b to cause those devices to retransmit their passwords in an attempt to reconnect to the WAP 110. The intruder device 150 may receive and then attempt to decrypt the retransmitted passwords. For example, the intruder device 150 may carry out a repetitive trial-and-error process to attempt decryption using a library of potential passwords until the received password is properly decrypted. The intruder device 150 may then attempt to connect to the WAP 110 and/or the associated end-point device. In some embodiments of the present invention, the end-point devices 1210a-b and/or the WAP 110 may generate a security alert in response to receiving or detecting a disassociation message and/or or in response to detecting at least a threshold plurality number of disassociation messages in a threshold time. The WAP 110 may also generate a security alert in response to detecting a disassociation message that uses the WAP's identity (e.g., when the WAP 110 detects that another device is identifying itself as the WAP 110). Accordingly, repetitive disassociation message can be flagged as a potential security attack to the network, and the events may be logged for review by a user and/or a user may be more immediately notified of the events.

The WAP 110 may generate the security alert based on receipt of at least a threshold number of probe request messages within a threshold time following transmission of a beacon request message, where the threshold number of probe request messages is greater than one. When the WAP 110 is in a push-button configuration mode (e.g., responsive to a user pressing the button 112), the WAP 110 may expect to receive a single probe request message from one of the end-point devices 120a-b when a user presses/selects a hardware/software button thereon. Accordingly, when the WAP 110 receives a relatively high number of probe request messages (e.g., 2, 5, 10) following its transmission of the beacon request message, it may determine that another device is attempting to interfere with and/or gain access to itself and may respond thereto by generating the security alert. Moreover, in the push-button configuration mode, the WAP 110 may expect at least a threshold time delay between when it transmits the beacon message and when it expects to subsequently receive the probe request message. The expected delay may be associated with a time delay between one of the end-point devices 120a-b displaying one or more prompts in response to receipt of the beacon message and a user observing and responding to the prompt(s) causing transmission of the probe request message to the WAP 110. Accordingly, when the WAP 110 receives the probe request message in less than a threshold time following transmission of the beacon message, it may determine that another device is attempting to interfere with and/or gain access to itself and may respond thereto by generating the security alert.

Generation of the security alert by the WAP 110 may include recording information relating to the security alert in a non-volatile memory therein. Recorded information may include at least some of the measured characteristics of interfering signal and/or the received connection request messages. The WAP 110 may generate the security alert by communicating information relating to the security alert through the broadband modem 140 and Internet 142/private network 144 to a network management center 160 and/or as an e-mail message and/or as an instant message to a defined user destination address (e.g., e-mail address, pager number, short message service number). The network management center 160 may be centrally operated by a telecommunications operator, such as an operator of DSL data services and/or coaxial cable data services to residences and/or businesses.

The WAP 110 may alternatively or additionally generate the security alert as a visual and/or audible notification to a user that indicates that the user should presently inhibit the WAP 110 from transmitting the connection response message with the encryption key to configure a new connection to an end-point device. For example, the WAP 110 may include one or more LEDs 114 or other apparatus for visually and/or audibly notifying a user. Accordingly, the WAP 110 may alert a user/operator of a potential ongoing security attack and may warn the user/operator to not attempt further configuration of the network at the present time and/or to use an alternate process (e.g., a more secure process) to configure devices connections to an end-point device (e.g., via a wired connection thereto).

According to some embodiments of the present invention, the end-point devices 120a-b are configured to measure characteristics of one or more probe response messages and/or beacon messages that appear to come from the WAP 110 or another valid WAP, and/or to measure characteristics of interfering signals in the defined frequency band used to communicate with the WAP 110. The end-point devices 120a-b are also configured to generate a security alert based on one or more of those measure characteristics.

The end-point device 120a may generate a security alert when it determines that there is a time correlation between its transmission of the probe request message, its receipt of the probe response message, and/or its receipt of the beacon message and the subsequent onset of an interfering signal in the defined frequency band. For example, the end-point device 120a may measure a time between transmission of the probe request message and the subsequent onset of a least one interfering signal having a least a threshold magnitude in the defined frequency band, and may generate the security alert based on the measured time being less than a threshold time. Similarly, the end-point device 120a may measure a time between receipt of the beacon message and/or the probe response message and a subsequent onset of a least one interfering signal having a least a threshold magnitude in the defined frequency band, and may generate the security alert based on the measured time being less than a threshold time. When, for example, the end-point device 120a determines that the interfering signal occurs soon after transmission of the probe request message, receipt of the beacon message, and/or receipt of the probe response message and/or when it observes a recurring pattern of such interference signals occurring after message transmission/receipt, the end-point device 120a may determine that another device is attempting to interfere with and/or gain access to the end-point device 120a, other end-point devices, and/or the WAP 110. The end-point device 120a may respond to that determination by generating the security alert.

The end-point device 120a may generate the security alert based on receipt of at least a threshold number of beacon messages and/or probe response messages within a threshold time following transmission of a probe request message, where the threshold number is greater than one. When the end-point device 120a is in a push-button configuration mode, it may expect to receive a single probe response message from the WAP 110. Accordingly, when the end-point device 120a receives a relatively high number of probe request messages (e.g., 2, 5, 10) following its transmission of the probe request message, it may determine that another device is attempting to interfere with and/or gain access to itself and may respond thereto by generating the security alert.

Moreover, in the push-button configuration mode, the end-point device 120*a* may expect at least a threshold time delay between when it transmits the probe request message and when it expects to subsequently receive the probe response message. The expected delay may be associated with a time delay between the WAP 110 displaying one or more prompts (e.g., one or more LEDs and/or on an alphanumeric display) to a user to, for example, press the button 112, and a user observing and responding to the prompt(s) causing transmission of the probe response message to the end-point device 120*a*. Accordingly, when the end-point device 120*a* receives the probe response message in less than a threshold time following transmission of the probe request message, it may determine that another device is attempting to interfere with and/or gain access to itself and may respond thereto by generating the security alert.

Generation of the security alert by the end-point device 120*a* may include recording information relating to security alert in a non-volatile memory therein. Recorded information may include at least some of the measured characteristics of an interfering signal, received connection response messages, and/or received beacon messages. The end-point device 120*a* may generate the security alert by communicating information relating to the security alert through the broadband modem 140 and Internet 142/private network 144 to the network management center 160 and/or as an e-mail message and/or as an instant message to a defined user destination address (e.g., e-mail address, pager number, short message service number). The end-point device 120*a* may be configured to be directly connected to the broadband modem 140 through a data modem provided by, for example, a Bluetooth, wireless USB, or other short range wireless communication interface and/or via a wireline connection such as, for example, a USB cable.

The end-point device 120*a* may alternatively or additionally generate the security alert as a visual and/or audible notification to a user that indicates that the user should presently inhibit the end-point device 120*a* from transmitting the connection request message and/or other messaging to the WAP 110 to prevent configuration of a new connection to an end-point device.

Figure 3:
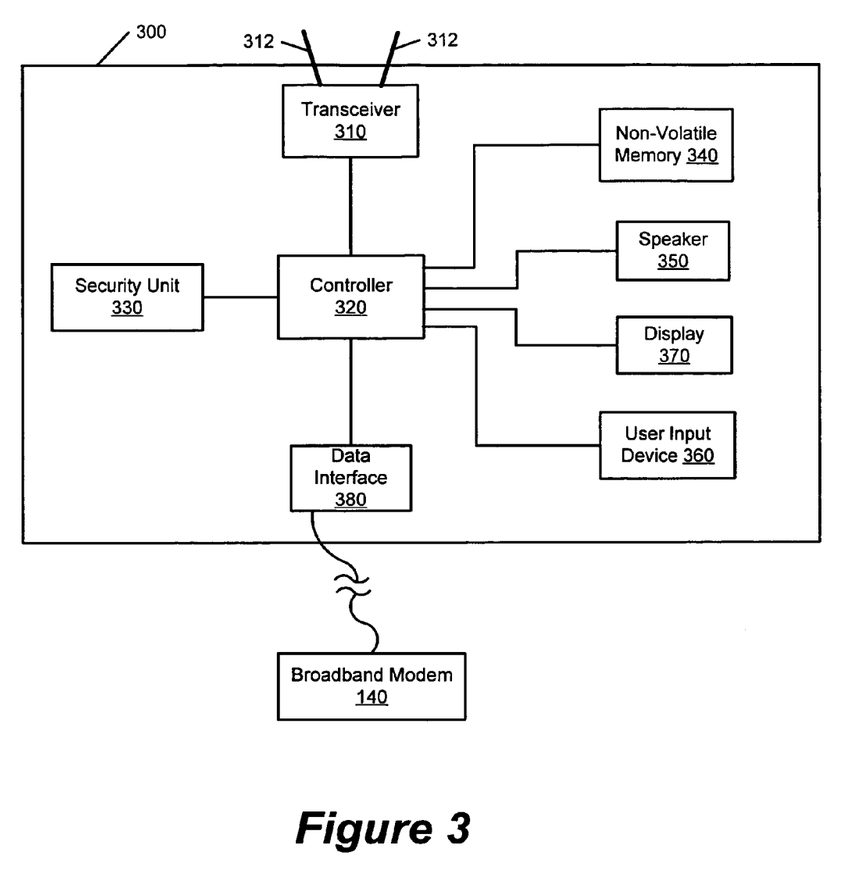
FIG. 3 is a schematic block diagram of a WAP according to some embodiments of the invention, and which may be appropriate for use as the WAP shown in FIG. 1.

FIG. 3 is a schematic block diagram of a WAP 300 according to some embodiments of the invention, and which may be appropriate for use as the WAP 110 shown in FIG. 1. The WAP 300 includes a transceiver 310, an antenna 312 (illustrated as two antennas for diversity transmission/reception), a controller 320, a security unit 330, a nonvolatile memory 340, a speaker 350, a user input device 360, a display 370, and a data interface 380.

The transceiver 310 may be configured to communicate through the antenna 312 using RF signals in the defined frequency band (e.g., 2.4 GHz). The controller 320 may configure communication connections to a plurality of end-point devices and carry out communication therewith using messaging that may include the well-known messaging defined by the IEEE 802.11 standards, Wireless Ethernet Compatibility Alliance standards, and/or Wi-Fi Alliance standards. The data interface 380 may be configured to communicate through the broadband modem 140 with the Internet 142 and/or the private network 144 (FIG. 1).

The security unit 330 is configured to generate one or more security alerts in accordance with at least some of the embodiments described above for the WAP 110. The security unit 330 may be configured to measure characteristics of one or more probe request messages that appear to come from a valid end-point device and/or to measure characteristics of interfering signals in the defined frequency band used to communicate with the end-point devices 120*a-b*, as described above with regard to the WAP 110. The security unit 330 may also be configured to generate a security alert based on one or more of those measure characteristics, such as was described above with regard to the WAP 110.

For example, the security unit 330 may record information relating to a security alert in the non-volatile memory 340. Recorded information may include at least some of the measured characteristics of an interfering signal and/or the received connection request messages. The security unit 330 may generate the security alert by communicating information relating to a security alert through the data interface 380, the broadband modem 140, and the Internet 142/private network 144 to the network management center 160 and/or as an e-mail message and/or as an instant message to a defined user destination address (e.g., e-mail address, pager number, short message service number). The security unit 330 may alternatively or additionally generate the security alert as a visual notification on the display 370 (e.g., LEDs or other binary type light indicators and/or on a alphanumeric display) and/or may generate an audible notification through the speaker 350 to a user that indicates that the user should presently inhibit the WAP 300 from configure a new connection to an end-point device.

Figure 4:
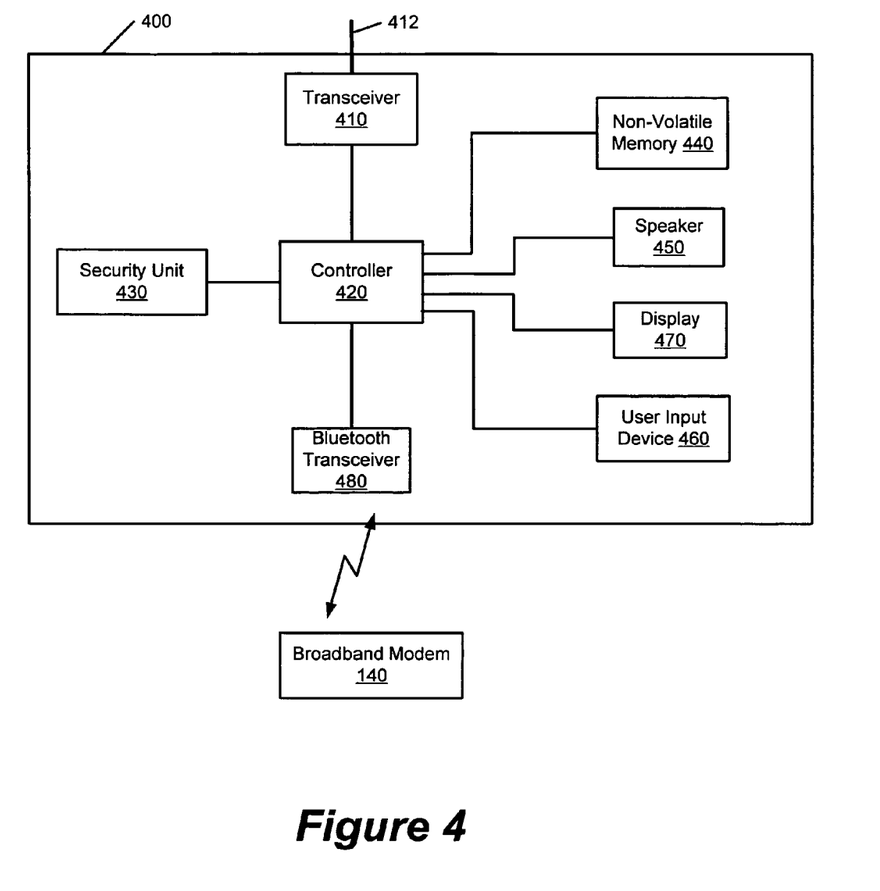
FIG. 4 is a schematic block diagram of an end-point device according to some embodiments of the invention, and which may be appropriate for use as the end-point device shown in FIG. 1.

FIG. 4 is a schematic block diagram of an end-point device 400 according to some embodiments of the invention, and which may be appropriate for use as at least one of the end-point devices 120*a-b* shown in FIG. 1. The end-point device 400 includes a transceiver 410, an antenna 412, a controller 420, security unit 430, a nonvolatile memory 440, a speaker 450, a user input device 460, a display 470, and may include a Bluetooth, wireless USB, and/or other short range RF communication transceiver 480.

The transceiver 410 may be configured to communicate through the antenna 412 using RF signals in the defined frequency band (e.g., 2.4 GHz). The controller 420 may configure a communication connection to a WAP device and to carry out communication therewith using messaging that it may include the well-known messaging defined by the IEEE 802.11 standards, Wireless Ethernet Compatibility Alliance standards, and/or Wi-Fi Alliance standards. The Bluetooth transceiver 480 may be configured to communicate through the broadband modem 140 with the Internet 142 and/or the private network 144.

The security unit 430 is configured to generate one or more security alerts in accordance with at least some embodiments described above for the end-point devices 120*a-b*. The security unit 430 may measure characteristics of one or more probe response messages and/or beacon messages that appear to come from the WAP 110 and/or may measure characteristics of interfering signals in the defined frequency band used to communicate with the WAP 110, such as was described above with regard to the end-point devices 120*a-b*. The security unit 430 may be configured to generate a security alert based on one or more of those measured characteristics, such as was described above with regard to the end-point devices 120*a-b*.

For example, the security unit 430 may record information relating to a security alert in the non-volatile memory 340. Recorded information may include at least some of the measured characteristics of the interfering signal(s) and/or the received connection request message(s). The security unit 330 may generate the security alert by communicating information relating to the security alert through the Bluetooth transceiver 480, the broadband modem 140, and the Internet 142/private network 144 to the network management center 160 and/or as an e-mail message and/or as an instant message to a defined user destination address (e.g., e-mail address, pager number, short message service number). The security unit 430 may alternatively or additionally generate the security alert as a visual notification on the display 470 and/or may generate an audible notification through the speaker 450 to a user that indicates that the user should presently inhibit the end-point device 400 from configuring a new connection to a WAP and/or to warn the user to utilize a different (e.g., a more secure) configuration process (e.g., via a wired connection thereto).

Figure 5:
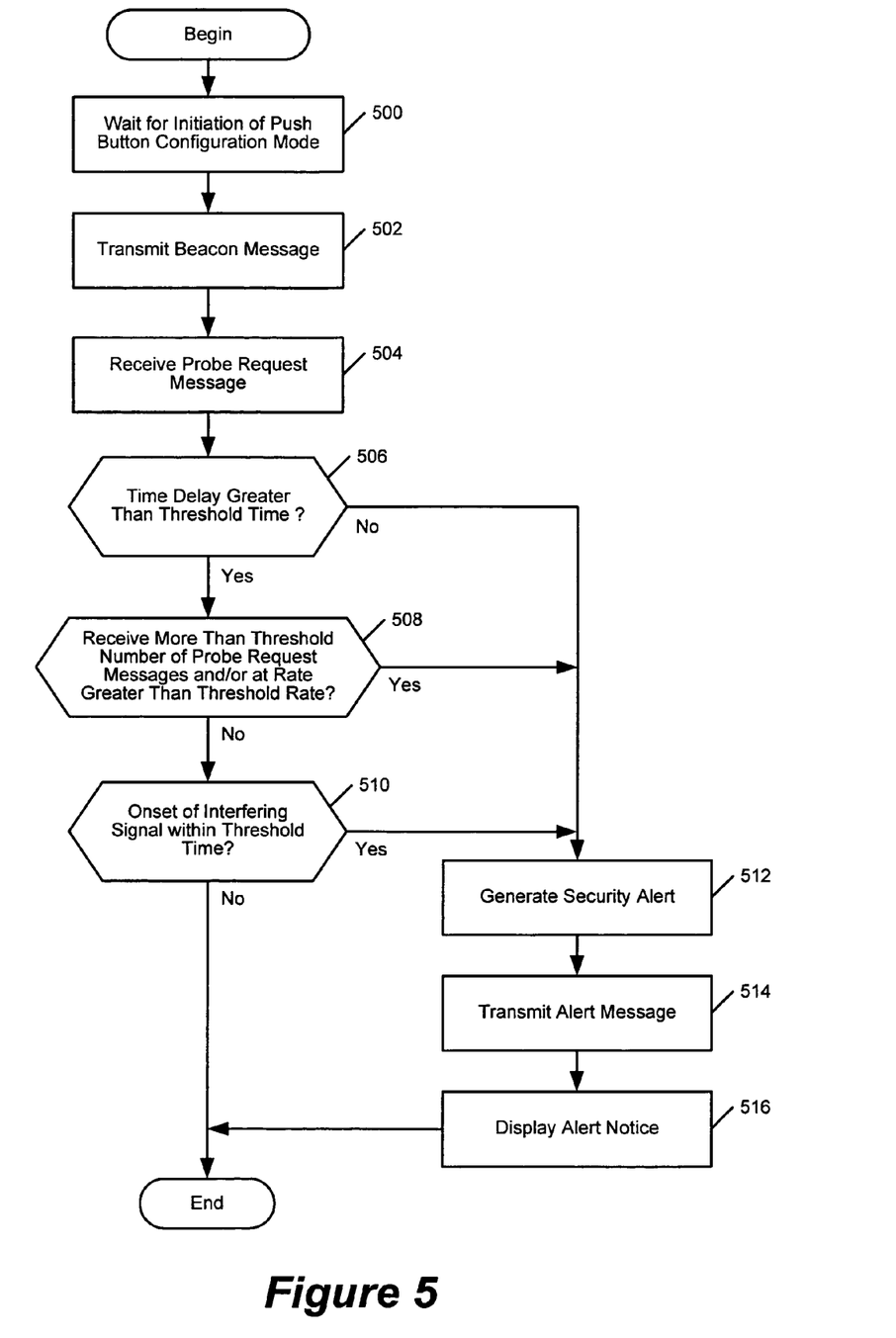
FIG. 5 is a flowchart illustrating operations for operating a WAP according to some embodiments of the invention.

FIG. 5 is a flowchart illustrating operations for operating a WAP to generate security alerts therefrom in accordance with some embodiments of the invention. At block 500, the WAP waits for initiation of a push button configuration mode. A beacon message is transmitted from the WAP at block 502 in response to initiation of a push button configuration mode. A probe request message is received by the WAP at block 504. A decision is made at block 506 as to whether the time delay between transmission of the beacon message and receipt of the probe request message is greater than a threshold time. If so, then another decision is made at block 508 as to whether more than a threshold number of probe request messages were received and/or whether a plurality of probe request messages were received at a rate that is greater than a threshold rate. If not, then a further decision is made at block 510 as to whether there was an onset of an interfering signal within the defined frequency band within a threshold time of the transmission of the beacon message at block 502. In an alternative decision pathways from blocks 506, 508, and 510, a security alert is generated at block 512. A security message is transmitted at block 514, such as to a device associated with a user and/or to a network management center. An alert notice is displayed at block 516 on the WAP and/or at another device that is associated with the WAP.

Figure 6:
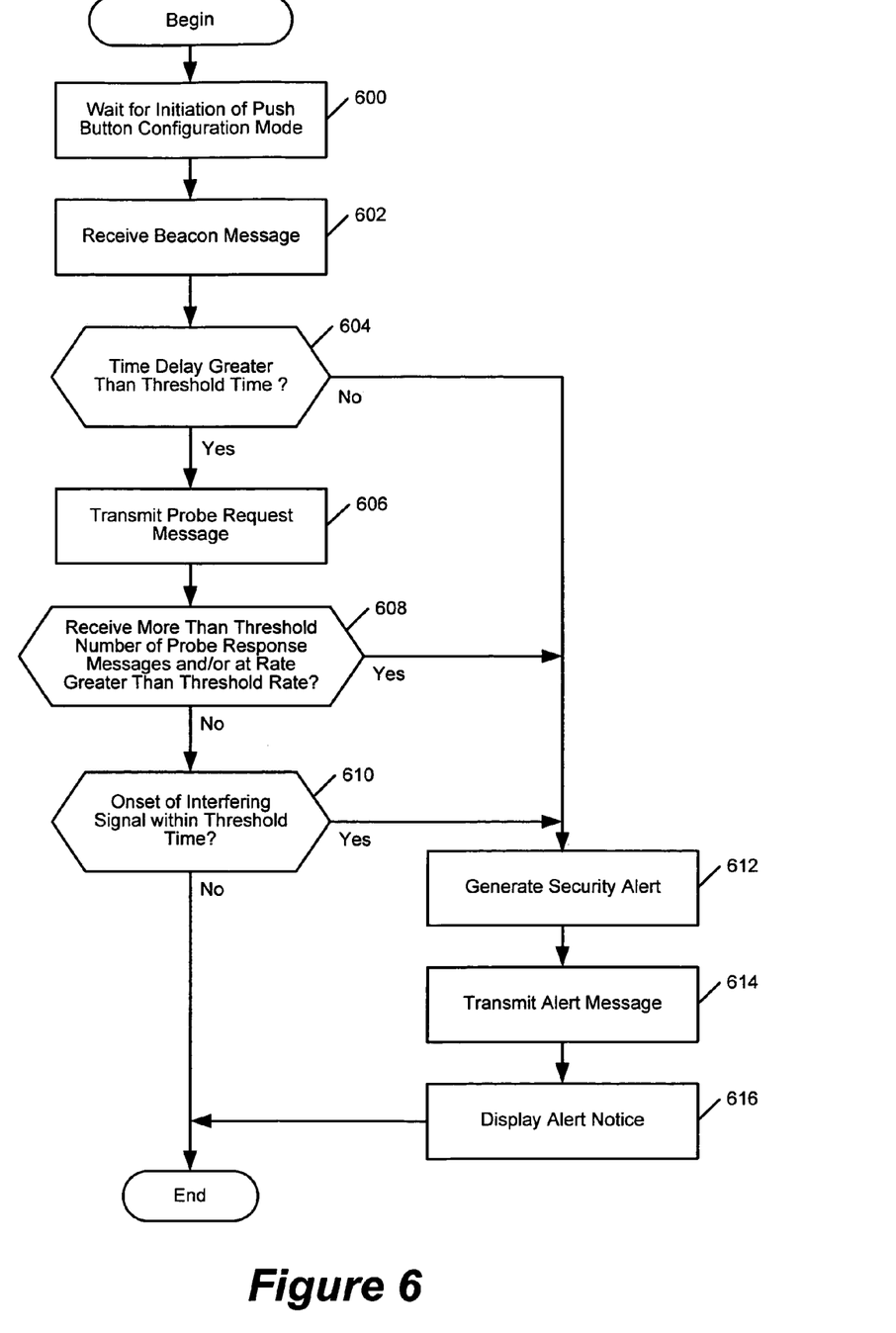
FIG. 6 is a flowchart illustrating operations for operating an end-point device according to some embodiments of the invention.

FIG. 6 is a flowchart illustrating operations for operating an end-point device to generate security alerts therefrom in accordance with some embodiments of the invention. At block 600, the end-point device waits for initiation of a push button configuration mode. A beacon message is received at block 602. A decision is made at block 604 as to whether a time delay between initiation of the push button configuration mode at block 600 and receipt of the beacon message at block 602 is greater than a threshold time. If so, then a probe request message is transmitted at block 606. A decision is made at block 608 as to whether more than a threshold number of probe response messages were received following transmission of probe request messages at block 606, and/or whether a plurality of probe response messages were received at a rate that is greater than a threshold rate. If not, then a further decision is made at block 610 as to whether there was an onset of an interfering signal within the defined frequency band within a threshold time following receipt of the beacon message at block 602 and/or following transmission of the probe request message at block 606. In an alternative decision pathways from blocks 604, 608, and 610, a security alert is generated at block 612. A security message is transmitted at block 614, such as to a device associated with a user and/or to a network management center. An alert notice is displayed at block 616 on the end-point device and/or at another device that is associated with the end-point device.

Although various embodiments of the present invention have been discussed in the context of the WAP 110 and the end-point devices 120*a-b* being configured to communicate in accordance with the IEEE 802.11 standards, it is to be understood that the invention is not limited thereto. Accordingly, it is to be understood that instead of communicating probe request messages and probe response messages therebetween in accordance with the IEEE 802.11 standards, the end-point devices 120*a-b* and the WAP 110 may more generally transmit any type of connection request messages from one of the end-point devices 120*a-b* to request connection to the WAP 110, and may transmit any type of connection response messages from the WAP 110 to one or more of the end-point devices 120*a-b* to configure one or more communication connections therebetween.

Various embodiments of the present invention have described in part above with reference to flowchart illustrations and/or block diagrams of apparatus, methods, and computer program products. It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved. Moreover, the functionality of a given block of the flowcharts and/or block diagrams may be separated into multiple blocks and/or the functionality of two or more blocks of the flowcharts and/or block diagrams may be at least partially integrated. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-readable storage medium having computer-readable program code embodied in the medium. Any suitable computer-readable storage medium may be utilized including a semiconductor or other electronic computer memory, a magnetic storage device such as a disk drive, and/or an optical storage device such as a CD drive and/or DVD drive.

The term "controller", as used herein, may include discrete time logic (e.g., gate array) and/or programmable data processing apparatus, and/or continuous time analog circuitry that is configured to carry out at least some of the functionality described herein.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless local area network access point comprising:
 a transceiver that is configured to communicate messages with an end-point communication device through a wireless air interface in a defined frequency band;
 a controller that is configured to receive through the transceiver a connection request message containing a password from the end-point communication device, to authenticate the received password, and to respond to the authentication by transmitting through the transceiver to the end-point communication device an encryption key as a connection response message;

a security unit that is configured to measure a first time between receipt of the connection request message and a subsequent onset of at least one interfering signal having at least a threshold magnitude in the defined frequency band, wherein the security unit is configured to measure a second time between transmission of the connection response message and receipt of the connection response message, and to generate a security alert based on one of the first and second measured times being less than a threshold time, and wherein the security unit is configured to generate a security alert based on detecting at least one disassociation message received from another device that contains an identifier associated with the wireless local area network access point and therefore incorrectly appears to have originated from the wireless local area network access point; and an interface that is configured to be communicatively connected to the Internet through a broadband modem, wherein the security unit is further configured to communicate information relating to the security alert through the interface to a network management center.

2. The wireless local area network access point of claim 1, wherein:
the security unit is further configured to generate the security alert by generating a visual to a user that indicates that the user should take action to better secure communications by the wireless local area network access point.

3. The wireless local area network access point of claim 1, wherein:
the security unit is further configured to generate the security alert by generating an audible notification to a user that indicates that the user should take action to better secure communications by the wireless local area network access point.

4. The wireless local area network access point of claim 1, wherein:
the controller is further configured to transmit a beacon message that contains information that is indicative of a present connection configuration availability of the wireless local area network access point; and
the security unit is further configured to measure a time between transmission of the beacon message and subsequent onset of at least one interfering signal having at least a threshold magnitude in the defined frequency band, and to generate the security alert based on the measured time being less than a threshold time.

5. The wireless local area network access point of claim 1, wherein the security unit is further configured to communicate information relating to the security alert as at least one of an email message and an instant message through the interface to a defined user destination address.

6. An end-point communication device comprising:
a transceiver that is configured to communicate messages with a wireless local area network access point through a wireless air interface in a defined frequency band;
a controller that is configured to transmit through the transceiver to the wireless local area network access point a connection request message containing a password, to receive a connection response message through the transceiver from the wireless local area network access point that contains an encryption key, and to configure a communication network with the wireless local area network access point in response to the connection response message,
the controller is further configured to transmit the connection request message in response to a pushbutton mode activated by a user selection on a user interface of the end-point communication device; and
a security unit that is configured to measure a time between transmission of the connection request message and a subsequent receipt of the connection response message which is expected to have been generated by a subsequent delayed user initiation of a pushbutton mode by a user selection on a user interface of the wireless local area network access point which initiates transmission of the connection response message from the wireless local area network access point, and to generate a security alert based on the measured time being less than a threshold time, and wherein the security unit is configured to measure a first time between transmission of the connection request message and a subsequent onset of at least one interfering signal having at least a threshold magnitude in the defined frequency band, and that is configured to measure a second time between transmission of the connection response message and subsequent receipt of the connection response message, and to generate the security alert based on one of the first and second measured times being less than a threshold time.

7. The end-point communication device of claim 6, further comprising:
a rewritable non-volatile memory, wherein the security unit is further configured to generate the security alert by recording information relating to the security alert as a user accessible log in the nonvolatile memory.

8. The end-point communication device of claim 6, further comprising:
an interface that is configured to be communicatively connected to the Internet through a modem, wherein the security unit is further configured to communicate information relating to the security alert through the interface and connected Internet to a network management center.

9. The end-point communication device of claim 6, wherein the controller is further configured to generate the security alert in response to receiving a disassociation message.

10. The end-point communication device of claim 9, wherein the controller is further configured to generate the security alert in response to receiving at least a threshold plurality number of disassociation messages within a threshold time.

* * * * *